United States Patent
Cohoe et al.

[11] Patent Number: 6,108,309
[45] Date of Patent: Aug. 22, 2000

[54] SONET NETWORK ELEMENT SIMULATOR

[75] Inventors: Andrew B. Cohoe, Larkspur; Steven J. Martino, Colorado Springs, both of Colo.

[73] Assignee: MCI Communications Corporation, Washington, D.C.

[21] Appl. No.: 08/987,068

[22] Filed: Dec. 8, 1997

[51] Int. Cl.[7] ................................................. H04L 1/00
[52] U.S. Cl. ............................................................ 370/241
[58] Field of Search .................................... 370/241, 242, 370/244, 245, 250, 907; 714/712, 713; 709/224

[56] References Cited

U.S. PATENT DOCUMENTS

| | | | |
|---|---|---|---|
| 4,725,970 | 2/1988 | Burrows et al. | 395/500.35 |
| 5,473,596 | 12/1995 | Garafola et al. | 370/241 |
| 5,726,979 | 3/1998 | Henderson et al. | 370/254 |
| 5,761,486 | 6/1998 | Watanabe et al. | 395/500.42 |
| 5,809,282 | 9/1998 | Cooper et al. | 709/226 |
| 5,881,237 | 3/1999 | Schwaller et al. | 709/224 |
| 5,907,696 | 5/1999 | Stilwell et al. | 395/500.34 |

*Primary Examiner*—Chau Nguyen
*Assistant Examiner*—Suibel M. H. Schuppner

[57] ABSTRACT

A network simulator for use as a testing tool for a network management system includes an input device for inputting data containing network elements, their attributes, and information about their configuration, for storage in memory. User-defined scenario instructions for specifying particular network behavior and user directives are input in real time, or in advance of simulation. The simulator includes an input/output processing component that receives commands from the network management system and user-scenario data or directives and forwards received commands and directives to a response generator processing component that generates appropriate responses in accordance with the network element behavior data stored in memory. The response generator processing component transmits responses back to the network management system. Directives and user-scenario data are also forwarded to an autonomous message generator component for autonomously generating one or more alarm or event messages for input to the network management system at pre-defined times. The tool is capable of continuous and concurrent operation as in a real network and provides real-time performance monitoring of the network elements.

20 Claims, 12 Drawing Sheets

↙200

ALMCDE 4
                "A"        0        "Autonomous Alarm"
                "*"        1        "Minor Alarm"
                "**"       2        "Major Alarm"
201╲            "*C"       3        "Critical Alarm"
        AIDTYPE 32
                "EQPT01"   0        "help string"
                "EQPT02"   1        "help string"
                                    ⋮
202╲
        AIDDEF 32
                "EQPT01"   0    1    0    -2 HS1-PW2H HS2-PW2H
                "EQPT02"   1    1    0    -2 HS1-MP2H HS2-MP2H
                "EQPT03"   2    1    0    -2 HS1-AW2H HS2-AW2H
                                    ⋮

ALMTYPE 4
                "BATTERY"  0        "Help String"
                "CLFAN"    1        "Help String"
                "HITEMP"   2        "Help String"
203╲            "MISC"     3        "Help String"
        CONDEFF 5
                "NL"       0        "Help String"
                "CL"       1        "Help String"
                "CR"       2        "Help String"
                "SC"       3        "Help String"
204╲            "TC"       4        "Help String"
        CONDTYPE 81
                "3BRD1-W1" 1        "help string"
                "3BRD1-W3" 2        "help string"
                                    ⋮

DIRN 5
                "NL"       -1       "Help String"
                "RCV"      0        "Help String"
                "TRMT"     1        "Help String"
                "BTH"      2        "Help String"
                "NA"       3        "Help String"
        ERRCDE 20
                "ENPS"     0        "Help String"
                "ENPM"     1        "Help String"
                "ENRI"     2        "Help String"
206╲                                ⋮
        LOCN 5
                "NL"       -1       "Help String"
                "NEND"     0        "Help String"
                "FEND"     1        "Help String"
                "A"        2        "Help String"
                "B"        3        "Help String"
208╲                                ⋮
        MONTYPE 30
                "CVL"      0        "Help String"
                "CVP"      1        "Help String"
209╲                                ⋮
        SRVEFF 3
                "NL"       -1       "Help String"
                "SA"       1        "Help String"
                "NSA"      2        "Help String"
                                    ⋮

| STS11 | UASP | STS1 | FEND | RCV  | 0.20 | 15-MIN | 1 | 10  | 63    |
|-------|------|------|------|------|------|--------|---|-----|-------|
| T3    | CVL  | T1   | NEND | TRMT | 1.00 | 15-MIN | 1 | 387 | 16383 |
| T3    | ESL  | T1   | NEND | TRMT | 1.00 | 15-MIN | 1 | 25  | 900   |

```
5   300
0   1    "   "   "
"                          ⎫
1   1   "Enter TID [local] :"  "  ⎬ 232
"                          ⎭
2   1   "
```

Username :"   "USERNAME"
3   1   "Password:  "   "PASSWORD"
4   0   "

ALCATEL

HELP MENU                    ╲233
? or HELP      Type ? or HELP for this menu
MENU           Type MENU or a \'TL1 VERB\' for menu mode.
R              Recall/Edit last command.
<ESC>    '^['  Reset command input processing.
<CAN>    '^X'  Reissue current prompt and reset line input.
<DEL>          Restart current line input.
<BS>     '^H'  Delete previous input character.

| 9 |      |       |      |   |      |   |   |                |
|---|------|-------|------|---|------|---|---|----------------|
|   | EQPT | TVFA1 | 0 | 31.5 | 0 | IS   | 1 | 0 | -2 HS1-AW2H HS2-AW2H |
|   | EQPT | RVFA1 | 0 | 31.5 | 0 | NULL | 1 | 0 | -2 HS1-AW2H HS2-AW2H |

```
    250
     ↓
251  615
 ALARM:  "COM - Cable remove for overhead communication 1"  "CTNOHBCOM1"  "Cable remove for overhead communication 1"
         COM-31-0  0  999  1  "CTNOHBCOM1"  1  -1  NULL  0  1  ALM  MN  NSA  TRMT  NEND  MN
 ALARM:  "COM - Cable remove for overhead communication 1"  "CTNOHBCOM1"  "Cable remove for overhead communication 1"
         COM-31-0CL  0  999  1  "CTNOHBCOM1"  1  -1  NULL  0  1  ALM  CL  NSA  TRMT  NEND  MN
 ALARM:  "COM - Cable remove for overhead communication 2"  "CTNOHBCOM2"  "Cable remove for overhead communication 2"
         COM-31-1  0  999  1  "CTNOHBCOM2"  1  -1  NULL  0  1  ALM  MN  NSA  TRMT  NEND  MN
 ALARM:  "COM - Cable remove for overhead communication 2"  "CTNOHBCOM2"  "Cable remove for overhead communication 2"
         COM-31-1CL  0  999  1  "CTNOHBCOM2"  1  -1  NULL  0  1  ALM  CL  NSA  TRMT  NEND  MN
 ALARM:  "COM - Clock distribution cable remove primary"  "CTNCLKDISTP"  "Clock distribution cable remove primary"
         COM-31-2  0  999  1  "CTNCLKDISTP"  1  -1  NULL  0  1  ALM  MN  NSA  TRMT  NEND  MN
 ALARM:  "COM - Clock distribution cable remove primary"  "CTNCLKDISTP"  "Clock distribution cable remove primary"
         COM-31-2CL  0  999  1  "CTNCLKDISTP"  1  -1  NULL  0  1  ALM  CL  NSA  TRMT  NEND  MN
 ALARM:  "COM - Clock distribution cable remove secondary"  "CTNCLKDISTS"  "Clock distribution cable remove secondary"
         COM-31-3  0  999  1  "CTNCLKDISTS"  1  -1  NULL  0  1  ALM  MN  NSA  TRMT  NEND  MN
 ALARM:  "COM - Clock distribution cable remove secondary"  "CTNCLKDISTS"  "Clock distribution cable remove secondary"
         COM-31-3CL  0  999  1  "CTNCLKDISTS"  1  -1  NULL  0  1  ALM  CL  NSA  TRMT  NEND  MN
 ALARM:  "COM - Manual switch for clock source"  "MANSW"  "Manual switch for clock source"
         COM-31-4  0  999  1  "MANSW"  1  -1  NULL  0  1  EVT  TC  NL  TRMT  NEND  WR
```

FIG. 3F

```
271
 ↓
 3   FLM600_def.dat         FLM600_alm.dat         FLM600_pmc.dat          4  0  0  0  0  0  P    ""FUJITSU OC-12"
 4   FLM2400_def.dat        FLM2400_alm.dat        FLM2400_pmc.dat         4  0  0  0  0  0  P    "FUJITSU LRE"       FLM2400_prv.dat
 5   NECITS2400_def.dat     NECITS2400_alm.dat     NECITS2400_pmc.dat      2  1  0  0  0  0  PB   "NEC LTE"
 6   ADM50_def.dat          ADM50_alm.dat          ADM50_pmc.dat           1  1  0  1  0  0  P    "ALCATEL OC-1"      ADM50_log.dat
 7   OC48.LTE.07.00_def.dat OC48.LTE.07.00_alm.dat OC48.LTE.10.00_pmc.dat  0  0  0  0  0  0  PB   "Nortel OC-48 LTE Release 7."
 8   OC48.LRE.10.00_def.dat OC48.LRE.10.00_alm.dat OC48.LTE.10.00_pmc.dat  0  0  0  0  0  0  PB   "Nortel OC-48 LRE Release 10."
 9   OC48.LTE.10.00_def.dat OC48.LTE.10.00_alm.dat OC48.LTE.10.00_pmc.dat  0  0  0  0  0  0  PB   "Nortel OC-48 LTE Release 10."
10   OC48.ADM.10.00_def.dat OC48.ADM.10.00_alm.dat OC48.LTE.10.00_pmc.dat  0  0  0  0  0  0  PB   "Nortel OC-48 ADM Release 10."
11   NECITS600_def.dat      NECITS600_alm.dat      NECITS600_pmc.dat       2  0  0  0  0  0  P    "Alcatel 1648"
12   ALC1648_def.dat        ALC1648_alm.dat        ALC1648_pmc.dat         2  0  0  0  0  0  P    "Alcatel 1648"
13   PIR_T31_def.dat        PIR_T31_alm.dat        PIR_T31_pmc.dat         3  3  0  1  0  0  P    "Pirelli"
                       ...
```

```
                                              288
        honest_gui_scen  2893  3600.000000  11
        ADM0001ADM0001P 25001 6 1 1 0 1
 290a   TRPJNJ 1 1 6 1 1 AMTRAK      -1 -1 -1 -1           285
  292a
 290b    FLM0003 FLM0003P 25009 3 1 7 0 1
         HAWDCA-ALTE010020202 1 1 3 7 1 HAWDCAFLM -1 -1 -1 -1
         FLM0102 FLM0102P 25087 3 1 8 0 1
         SNDOCA-ALTE010050301 1 1 3 8 1 SNDOCAFLM -1 -1 -1 -1
 292b    ITS2400 ITS2400P 25088 5 1 9 0 1
  290c   ITS2400 1 1 5 9 1 PEN-MBJ8:1 -1 -1 -1 -1
   292c  ITS600 ITS600P 25089 11 1 9 0 1
         ITS600 1 1 11 9 1 PEN-MBJ8:1 -1 -1 -1 -1
  290i { OPCM711 OPCM711P 20711 10 1 5 1 OPCM711B 30711 10
        ⎡ O07702 1 1 10 5 1 BDG-WLTR9 -1 -1 -1 -1
        ⎢ O07703 1 1 10 5 1 BDG-WLTR9 -1 -1 -1 -1
        ⎢ O07704 1 1 8 5 1 BDG-WLTR9 -1 -1 -1 -1
        ⎢ O07705 1 1 10 5 1 BDG-WLTR9 -1 -1 -1 -1
  292i ⎨ O07706 1 1 8 5 1 BDG-WLTR9 -1 -1 -1 -1
        ⎢ O07707 1 1 10 5 1 BDG-WLTR9 -1 -1 -1 -1
        ⎢ O07708 1 1 8 5 1 BDG-WLTR9 -1 -1 -1 -1
        ⎢ O07709 1 1 10 5 1 BDG-WLTR9 -1 -1 -1 -1
        ⎢ O07710 1 1 8 5 1 BDG-WLTR9 -1 -1 -1 -1
        ⎣ O07711 1 1 10 5 1 BDG-WLTR9 -1 -1 -1 -1
        10
       ⎡ 2.0000   OC48-LOF       60.0000  0.01666667  1  OPCM719P  1  1  O07776  1  9  1
       ⎢ 4.0000   OC48-LOS       60.0000  0.01666667  1  OPCM719P  1  1  O07778  1  9  1
       ⎢ 5.0000   OC48-LOS       60.0000  0.01666667  1  OPCM719P  1  1  O07779  1  9  1
       ⎢ 8.0000   OC48-CKTPKMSM  60.0000  0.01666667  1  OPCM719P  1  1  O07782  1  9  1
   295⎨ 10.0000   OC48-TXCLKFL   60.0000  0.01666667  1  OPCM719P  1  1  O07784  1  9  1
       ⎢ 11.0000  OC48-TXCKTPKMSG 60.0000 0.01666667  1  OPCM719P  1  1  O07785  1  9  1
       ⎢ 16.0000  OC48-TXCKTPKFL 60.0000  0.01666667  1  OPCM718P  1  1  O07770  1  9  1
       ⎢ 17.0000  OC48-TXCKTPKMSG 60.0000 0.01666667  1  OPCM718P  1  1  O07771  1  9  1
       ⎢ 19.0000  OC48-TXLSRFL   60.0000  0.01666667  1  OPCM718P  1  1  O07773  1  9  1
       ⎣ 20.0000  OC48-TXCLKFL   60.0000  0.01666667  1  OPCM718P  1  1  O07774  1  9  1
        296    297    298   299  293  294        291
```

FIG. 3G

```
          honest_gui_PB 877 515212.000000 1                    } 80
  800     OPCM045 OPCM045P 20045 9 1 5 1 OPCM045B 30045 18
          O00742  1  1  9  5  1  MNJOMJ11:1   0   0   0   0
          O00743  1  1  9  5  1  MNJOMJ11:1   1   1   1   1
          O00744  1  1  9  5  1  MNJOMJ11:1   1   1   1   1
          O00745  1  1  9  5  1  MNJOMJ11:1   1   1   1   1
          O00746  1  1  9  5  1  MNJOMJ11:1   1   1   1   1    } 803
          O00747  1  1  9  5  1  MNJOMJ11:1   1   1   1   1
          O00748  1  1  8  5  1  MNJOMJ11:1  -1  -1  -1  -1
          O00749  1  1  8  5  1  MNJOMJ11:1  -1  -1  -1  -1       FIG. 3H
          O00750  1  1  8  5  1  MNJOMJ11:1  -1  -1  -1  -1
                            ⋮                    822 826
                                       818  820 824 828
      812   814    816                                                } 805
      EVT:  239.000   O01074   OPCM045P  1  5  8  0  9
      -1  -1  -1  -1  -1  1  1  6  -1222  100  2  2  -1 -1 -1 -1 -1  1 - BW
      -1  -1  -1  -1  -1  1  1  8  -1222  101  2  2  -1 -1 -1 -1 -1  1 - BW
      -1  -1  -1  -1  -1  1  1  6  -1222  102  2  2  -1 -1 -1 -1 -1  1 - BE
      -1  -1  -1  -1  -1  1  1  8  -1222  100  2  2  -1 -1 -1 -1 -1  1 - BE
      -1  -1  -1  -1  -1  1  1  6  -1222  101  2  2  -1 -1 -1 -1 -1  1 - AW  }810
      -1  -1  -1  -1  -1  1  1  8  -1222  100  2  2  -1 -1 -1 -1 -1  1 - AW
      -1  -1  -1  -1  -1  1  1  6  -1222  100  2  2  -1 -1 -1 -1 -1  1 - AE
      -1  -1  -1  -1  -1  1  1  8  -1222  100  2  2  -1 -1 -1 -1 -1  1 - AE
          832    836    840   844    848 852 856 860 864   868
       830    834    838   842   846   850 854 858 862 866
```

SONET NETWORK ELEMENT SIMULATOR

FIELD OF THE INVENTION

The present invention relates generally to telecommunications network management systems and specifically, to a SONET network simulator for providing robust testing of a telecommunications network management system.

BACKGROUND OF THE INVENTION

Synchronous Optical Networks ("SONET") represent a new generation of telecommunications networks and the collection of standards for network architectures and protocols. Coinciding with the rollout of new SONET networks is the development of SONET network management systems. A network management system ("NMS") is used to monitor a telecommunications network, provide status on the state of the network, and provide control over the network to resolve problems such as outages and traffic congestion. Control is provided in the form of commands issued to the network and responses received from the network.

FIG. 1 illustrates a very simplified architecture of a SONET network 50 connected to a Network Management System 75 via a WAN 65 implementing a TCP/IP communications transport protocol. A typical SONET network consists of thousands of network elements 60 and mediation devices 70 interconnected in many various configurations. A non-exhaustive list of network elements include the following types of telecommunications networks, services and equipment: digital and analog transmission systems such as cable, fibre, radio, satellite, etc; restoration systems; re-generation systems and termination equipment; public and private networks including both narrow and broadband ISDNs, mobile networks, etc; transmission terminals such as multiplexers, cross connects, channel translation equipment; operations systems and their peripherals; mainframe computers; front-end processors; file servers; area networks, e.g., WAN, LAN etc.; circuit and packet switched networks; and PBXs. Mediation devices 70 are used to concentrate several network elements at a single network address and additionally buffer messages sent from network elements 60 to the NMS 75. As shown in FIG. 1, one or more network elements can be connected to a mediation device.

In operation, each of the above-mentioned network elements autonomously send event messages, such as alarms, to the NMS over the TCP/IP WAN. In a typical network, the NMS may receive 2 alarms/second from 10,000 network elements in steady state operation, and 100 alarms/second in burst modes. The network elements also receive commands from the NMS including, for example, audit requests, provisioning requests, state requests, and switching commands. The network elements must then formulate response messages and send them to the NMS. These messages (both solicited and unsolicited) are typically formatted in accordance with an industry standard known as TL-1.

Prior to placing a new or modified NMS in production, the NMS must be thoroughly tested. Testing generally consists of three types: 1) functionality testing to ensure that the NMS meets the functional requirements; 2) stability testing to ensure that the NMS performs uniformly under the same conditions, and in response to the same activity being repeated; and 3) stress testing to ensure that the NMS performs as expected under conditions of high volumes of messages to and from the network.

Additionally, the users of the NMS would require proper training on the operation and use of the new or modified functions of the NMS.

Current testing techniques require that the NMS be connected to a test tool that simulates network elements, i.e., receive commands from the NMS and provide responses, as well as send unsolicited messages, such as simulated alarms, to the NMS. While functionality and stability testing may be performed easily with a simple tool that simulates one or a few network elements, stress testing requires simulation of an actual network requiring the generation of very large volumes of messages in order to simulate the thousands of network elements of a dozen or more types that constitute a typical SONET network. In addition, the test tool must support thousands of logical connections to the NMS, to represent the individual connections of each network element it is simulating.

Network simulators currently available cannot support the high volumes of message processing from the variety of network element types needed to simulate a large SONET network.

SUMMARY OF THE INVENTION

The present invention is a SONET network element simulation tool ("SNES") that simulates network elements and mediation devices that collectively form a SONET network, and provides high volumes of unsolicited messages to a SONET network management system ("NMS"), receives commands from an NMS, and sends back appropriate response messages. The high volumes produced by the network simulation tool of the invention equal those produced by an actual network, and therefore provides reliable stress and stability testing for the NMS, as well as functionality testing.

The SONET network element simulator ("SNES"), comprises four logical components: 1) a graphical user interface ("GUI"); 2) an input/output process; 3) a Command/response process; and 4) an autonomous message process. These core processes provide a unique division of labor and data loading scheme that allows the SNES to produce the high volume of message processing required. The architecture is also scalable so that it can maintain high volume performance by splitting large scenarios across multiple instances of the core processes thus allowing the invention to take advantage of computer systems that have multiple CPU's.

The SNES provides several facets of network simulation and can communicate with an NMS via TCP/IP transport protocol. It provides automatic generation and transmission of unsolicited event messages in high volumes. It receives commands from the NMS or a user input, and formulates appropriate responses to NMS simultaneous to unsolicited message generation. It can read messages that were generated by an actual network and playback those messages to the NMS to repeat an actual production scenario as a test scenario. It also provides the user the ability to perform anomaly testing of the NMS by allowing a user to inject command response delays, message time stamp biasing and simulated mediation device communications failure in real time through the user interface.

Advantageously, the SNES test tool could be also used in a lab setting to train users on the proper operation and the use of the NMS by processing captured production data or pre-defined scenarios.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

BRIEF DESCRIPTION OF DRAWINGS

FIGS. 3(a)–3(h) depict exemplary files that are input to the SNES system to define the SONET network elements to be simulated with FIG. 3(a) depicting a portion of an exemplary TL-1 attribute definition file 200; FIG. 3(b) depicting an exemplary of a performance monitoring definition file 210; FIG. 3(c) depicting an exemplary login performance definition file 230; FIG. 3(d) depicting an exemplary provisioning definition file 230; FIG. 3(e) depicting an exemplary alarm definition file 250; FIG. 3(f) depicting an exemplary Mediation Device/NE type definition file 270; FIG. 3(g) depicting an exemplary User Scenario file 285; and FIG. 3(h) depicting an exemplary converted playback data file.

FIG. 4(c) illustrating the concurrent initiation and initialization of both the CRP process and AMP process threads; FIG. 4(d) illustrating the high level flow diagram of the CRP process thread; and FIG. 4(e) illustrating the high level flow diagram of the AMP process thread.

DETAILED DESCRIPTION OF THE PREFERRED EMBODIMENT

Figure 1:
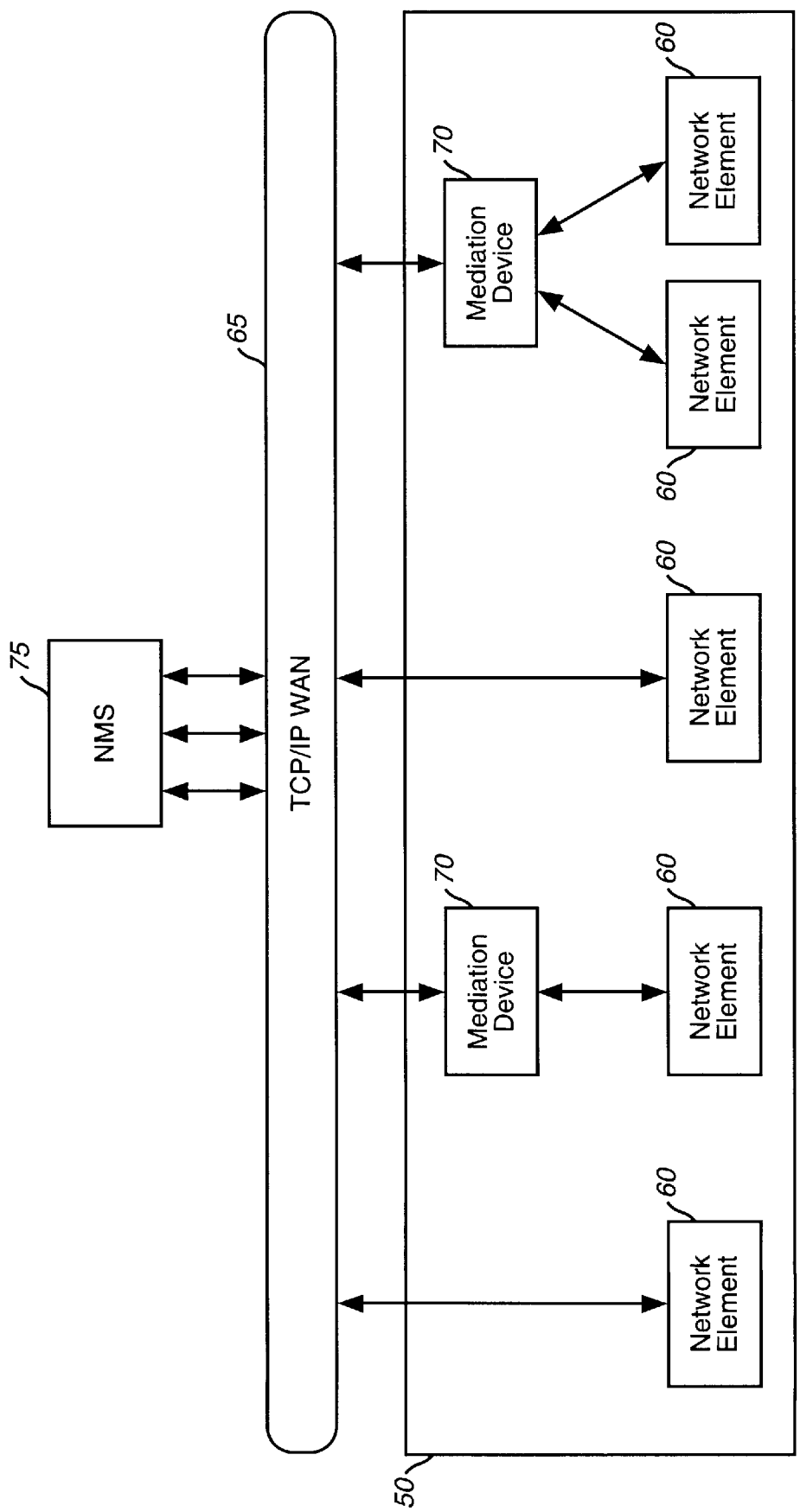
FIG. 1 illustrates a very simplified architecture of a SONET network connected to a Network Management System via a WAN.
Figure 2:
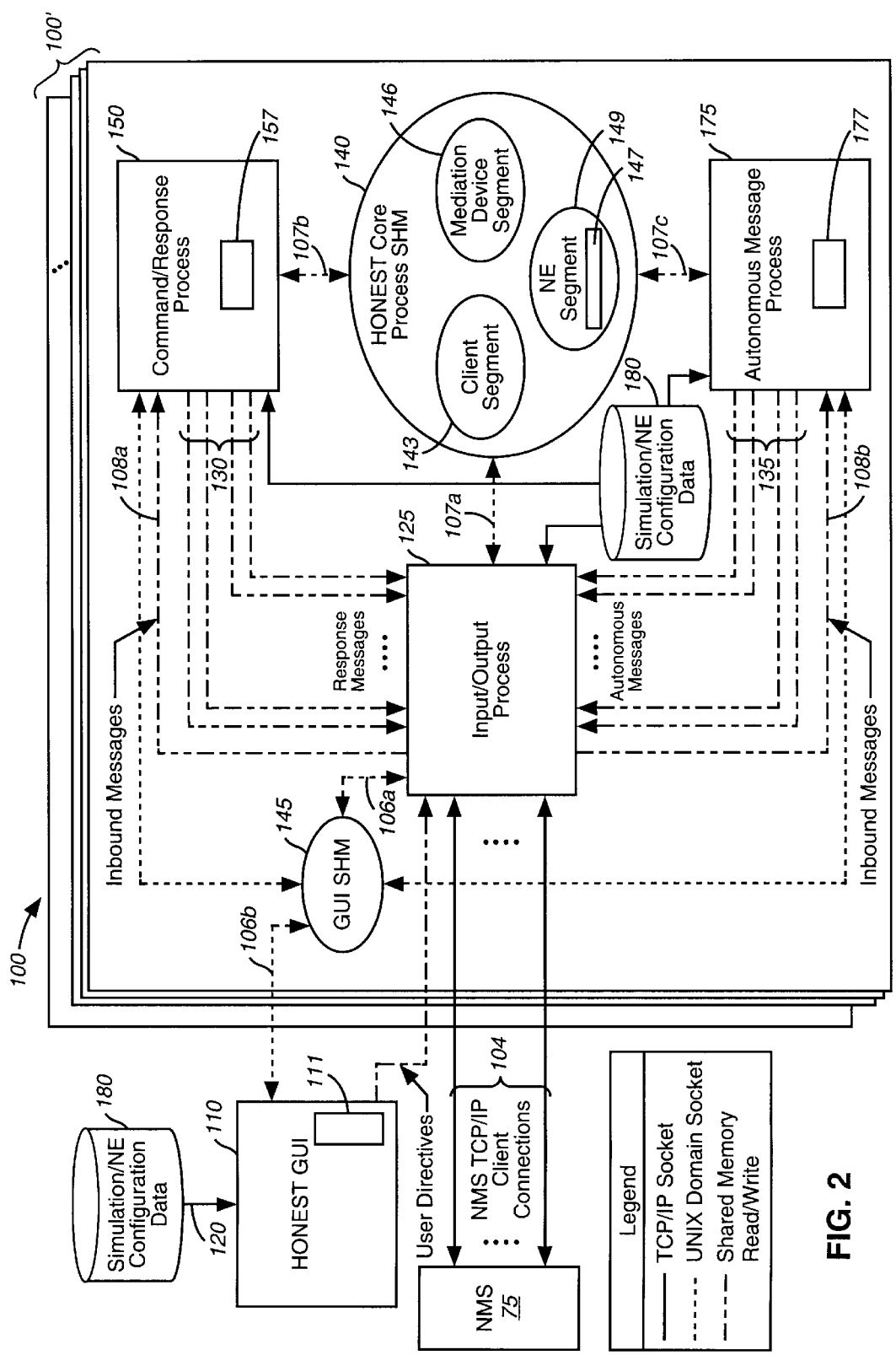
FIG. 2 illustrates a systems architecture of the SONET network element simulator ("SNES") of the invention.

FIG. 2 illustrates a systems architecture of the SONET network element simulator 100 ("SNES") of the invention. The SNES 100 may be realized on a computer system with a single processor or multiple processors and it is equipped with communications ports and cards to enable it to receive data from external sources and to communicate with an NMS 75. Preferably, the SNES 100 is connected via multiple TCP/IP links 104 over a WAN to the NMS 75 that is to be tested and it is with these links that the SNES receives commands from and sends messages to the NMS 75 in accordance with the industry standard Transaction Language 1 ("TL-1") protocol as described in Bellcore documents TA-396 and GR-833, the contents of which are incorporated by reference as if fully set forth herein. In the preferred embodiment, the SNES is built to run on a DEC Alpha 2100 midrange computer running with UNIX operating system. Additional DEC Alpha CPU's may be added to the computer system to provide throughput and scalability.

As shown in FIG. 2, the internal architecture of the SNES 100 comprises four logical process components and shared memory 140 of the computer it is running on. The four component processes are: 1) a Graphical User Interface 110 that reads simulation Configuration/Network Element (Config/NE) data 120 from a set of input files that specifies the equipment type and vendor of each network element and mediation device; 2) an input/output ("I/O") process 125 that handles all communications with the NMS; 3) a Command/Response ("CRP") process 150 CRP that receives NMS commands from the I/O Process and formulates responses; and 4) an Autonomous Message ("AMP") process 175 for generating unsolicited messages (events and alarms) for input to the NMS. Each of these processes are implemented as "C" language and Motif computer programs for operation on a UNIX computer system utilizing shared memory, TCP/IP, and UNIX Domain sockets, and preferably, are developed in accordance with industry standards to provide portability across different computer operating systems. Other configurations and equipment types are within the purview of skilled artisans.

In operation, the network elements in the simulator autonomously send event messages, e.g., alarms, to the NMS over the TCP/IP WAN. As in a typical network, the NMS can receive 2 alarms/second from 10,000 network elements in steady state operation, and 100 alarms/second in burst modes. The network elements also receive commands from the NMS including: audit requests, provisioning requests, state requests, and switching commands. As will be described, the network elements formulate response messages and send them to the NMS formatted in accordance with TL-1. Since several types of network elements and mediation devices may be in use, the TL-1 messages passed between the SONET network and the NMS may actually be in slightly different formats, i.e., each network element/mediation device vendor may have a different interpretation of TL-1.

Therefore, the SNES simulates the exact message structure of each network element and mediation device in use.

The SNES GUI process 110 receives simulation Configuration/Network Element (Config/NE) data 120 from a set of ASCII text files contained in a database 125 that specifies the equipment type and vendor of each network element and mediation device and the configuration of the network elements representing the SONET network, i.e., how the elements are arranged and which network elements are served by which mediation devices. In addition, as will be explained, other types of data can be input for simulation including: user defined SONET network scenario information; captured production data which is a log of TL-1 messages received by an NMS from an actual SONET network and which can be "played" back; and, user directives including those directives that enable: the suspension/resumption of alarm clearance; the disconnection of mediation device(s); the injection of command response delays; the biasing of message time stamps; the injection of alarms during simulation execution; and, the fast forwarding through a playback scenario.

Particularly, the (Config/NE) data 120 specifies all of the possible network elements/mediation devices available to a user to specify or configure a SONET network topology, and specifically, which network elements are served by which mediation devices in the network. New types of mediation devices and NE's to be simulated can be easily incorporated by simply transmitting the information to the configuration data contained in the shared memory.

FIGS. 3(a)–3(g) illustrate the types of ASCII data files 120 that can be input to shared memory. FIG. 3(a) depicts an exemplary TL-1 attribute definition file 200 that contains a list of all of the TL-1 attributes, including: the assign identifier ("AID") type section 201 containing the base equipment types of network elements to be simulated and their values in a form recognizable by TL-1; the AID definition section 202 which is used to identify discrete components contained in the base network element equipment; the condition effect attribute 203, the service effect attribute 209, conditions types 204, location attributes 206, monitor types 208 and their respective associated values used and recognized by the system 100 are shown in FIG. 3(a).

FIG. 3(b) depicts an exemplary performance monitoring definition file 210 that contains a list of the performance monitoring records that are used by the AMP 175 to generate autonomous performance monitoring messages. The performance message capability is provisioned to support a realistic model of an NE. Each record includes one or more of the following fields: the AID definition index field 212, the TL-1 Monitor Value attribute 214; the TL-1 AID Type attribute 216; the TL-1 Location attribute 218; the TL-1 Direction attribute 220; the probability 222 that the record will be reported (a random value between 0 and 1); the TL-1 Time Period attribute 224; and, minimum 226, maximum 227 and default 228 value fields. Specifically, a first simulated performance message carries the default value attribute 228. The values contained in all subsequent performance messages are determined by multiplying the maximum value attribute 227 by a randomly generated number between 0 and 1. The periodic frequency of the report is "hardcoded" to be 15 minutes, for example, but the message carries the value by the Monitor Value attribute 214.

FIG. 3(c) depicts an exemplary logon definition file 230 that defines the login dialogue for a Mediation device and comprises a set of records that define the text string 232 sent to the client and the expected response 233. FIG. 3(d) depicts an exemplary Provisioning definition file 240 that defines the provisioning records for each network element. Each record comprises the following fields: an AID type field 242; a Keyword field 243; minimum 245, maximum 246 and default 247 value fields; a Default state field 248 and a configuration-dependent AID Definition field 249.

FIG. 3(e) depicts an exemplary alarm definition file 250 containing one or more records that defines all possible alarms that the network element can generate. Preferably, each record comprises the following fields: a record indicator field 251; an alarm description field 252 containing the alarm text returned in the alarm message used by the GUI; the AID type field 253 containing the TL-1 AID type attribute; the alarm ID field 254 used by the GUI process; place holder fields 255; a reschedule indicator field 256; the CONDTYPE value (TL-1 message Condition Type attribute) field 257; the AID definition record 258; the configuration dependency indicator 258; the number of alarms associated with the record 259; and, the alarm type field 260. Other fields may include the TL-1 Notification code/Condition effect attribute 261; the SRVEFF value (TL-1 Service Affect attribute) field 262; the DIRN (TL-1 Direction attribute) field 263; the LOCN (TL-1 Location attribute) field 264; and a severity value in field 265.

FIG. 3(f) depicts an exemplary Mediation Device/NE type definition file 270 that lists all of the network elements modeled by the simulator system 100 with each record defining a unique network element type and containing the following fields: the Network element ID field 271; the TL-1 Attribute definition file name 272; the TL-1 Alarm definition file name 273; the Performance Monitoring Definition file name 274; the Autonomous message format type 275; the command response format type 276; the Login flag 277 which is used to indicate whether a login is required for a client connection; a "Peer" concept flag 278; the provisioning flag 279 to determine if provisioning information is to be modeled for a network element type; a "primary/backup" flag 280; the name of the network element type 281, e.g., Nortel; and two additional fields: a first field indicating the logon definition file 282 if the logon flag is set and, the Provisioning Definition file name 283 if the provisioning flag is set. It should be understood that when several types of network elements and mediation devices are in use, the TL1 messages passed between the SONET network and the NMS may actually be in slightly different formats, i.e., each network element/mediation device vendor may have a different interpretation of TL-1. Therefore, the SNES simulates the exact message structure of each network element and mediation device in use.

Files containing SONET network scenario data include one or more scripts that instruct the SNES 100 when to autonomously send messages to the NMS. Preferably, scenario data includes those SONET network scenarios that have been previously created and saved by the user and that specify the configuration of the SONET network in addition to the start time, frequency, and types of messages to generate during the execution of the scenario.

FIG. 3(g) depicts an exemplary User Scenario file 285 containing the mediation devices, network elements and alarm definitions saved by the user.

As shown in FIG. 3(g), the first line 288 sets forth the header record consisting of the file type, the number of bytes that make up the network element configuration section of the file, the scenario time limit, the number of mediation devices and, a user-specified text description (not shown). The remainder of the User Scenario file 285 comprises one or more mediation device sections, for example, mediation device sections 290a–290i, and corresponding network element sections, for example, network element sections 292a–292i, and, the event section 295. As shown, each mediation device section, e.g., section 290i, is a row if fields specifying the following data: the generic name of the mediation device; the primary name of the mediation device; the TCP/IP port number; the device type; the number of regions; the region numbers; the backup flag; the backup name and port if the backup flag is set to equal 1; and, the number of network elements. As shown, for mediation device section 290i, ten (10) network elements are shown under its control. In each corresponding network element section, e.g., network element section 292i having ten (10) network elements, the following data fields are specified: the network element name; the status flag; the PM flag; the device type; the region number; the number of modsects; the modsect name(s); and, one or more provisioning records, with four being illustrated in FIG. 3(g). In the event section 295, the scenario data instructions are specified in rows containing the following fields that specify: the time of the event 296; the event ID 297; the event duration 298; the event message rate 299; the OPC flag 293; the OPC name 294; the number of network elements; a place holder indicating a non-used field; the network element name 291; two additional place holders indicating non-used fields; and, the number of AID's.

As mentioned above, the SNES 100 can also process alarm message input files from captured Production data which is a log of TL-1 messages received by an NMS from actual SONET NE's. Using this as input, the SNES can playback those messages in a test environment to simulate an actual network under actual alarm conditions. The Production data is first converted into a SNES readable form using a preprocessor 111 located in the GUI. The preprocessor conversion process comprises the steps of parsing the alarm messages in the log file and creating a "converted" file suitable for input to the core processes. Additionally, the preprocessor 111 allows the user to filter the production data based on different criteria. The filtering criteria the user can use are: a time window (start and end time); specific NE types; or NE locations.

Figure 5:
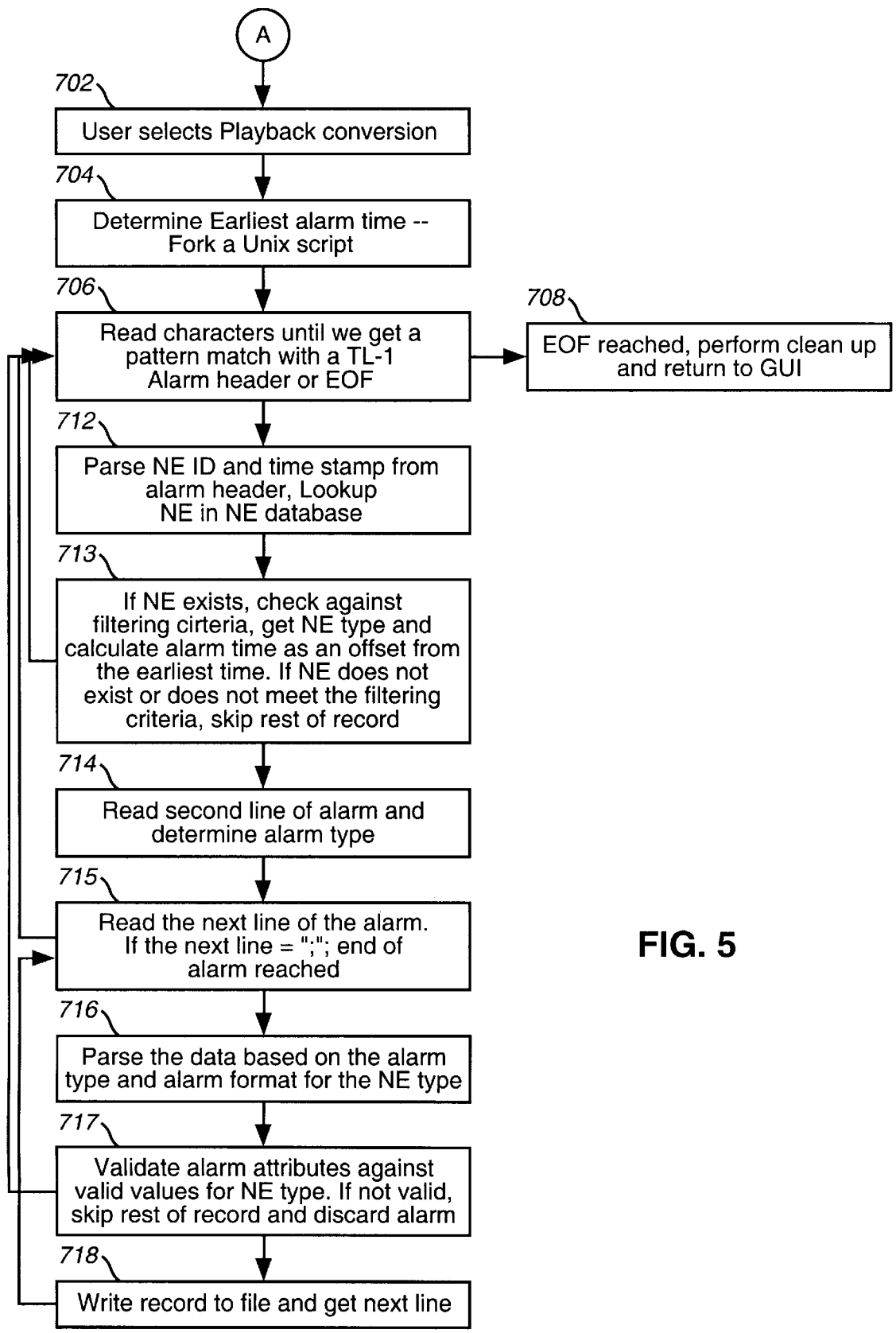
FIG. 5 is a flow diagram illustrating the playback conversion for testing log data of an actual SONET network.

FIG. 5 illustrates the process flow of the playback file conversion. As shown at step 703, FIG. 5, the user first selects to convert a production data file. The conversion process first determines the time of the earliest alarm in the file at step 704. This time is used as time 0.0 and all other alarm times that are processed are offsets from this time. Then, at step 706, the conversion process reads characters from the file until it gets a pattern match with a TL1 alarm header. Once an alarm header is found, the NE ID is parsed from the alarm header and is looked up in the NE database as indicated at step 712. if the NE is not found, the alarm record is skipped and the process starts looking for a new TL1 alarm header at step 713. If the NE is found, the NE type and mediation device are extracted to be used later in the processing and the alarm offset time is calculated from the alarm time stamp. As indicated at step 714, the second line of the alarm is then read and the type of alarm is determined. Based on the alarm type and alarm format for the NE type that generated the alarm, the body of the alarm is then read at step 715 until an end delimiter of the alarm is reached. For each record of the alarm body, the TL-1 attributes are parsed at step 716 and validated at step 717 against the valid TL-1 values for the NE type and TL-1 attribute. If an invalid value is found, the entire alarm record is skipped and the conversion process starts looking for the next alarm header record. If the attribute value is valid, the index of the attribute record in the TL-1 attribute definitions is returned and printed to the converted playback file at step 718. This process returns to step 706 and continues until the end of file is reached as indicated at step 708. At the end of processing the file, the conversion process generates a list of all mediation devices and NE's.

The converted playback file is a formatted list of event records with each record containing detailed information about the original alarm that is used during playback to reproduce the alarm. As shown in FIG. 3(*h*), the converted playback file 800 contains a file header 802 that identifies the file as a playback file, a NE definition section 803, the format of which is described with respect to FIG. 3(*f*), and, a converted playback event section 805 containing data records consisting of the following fields: a record indicator field 812, an event time field 814 (including an offset from time 0.0 with time 0.0 being the earliest alarm time), an NE ID field 816, a Mediation Device ID field 818, an Alarm type field 820, a TL1 alarm type field 822, the number of alarm records 824, an Alarm code (ALMCDE) field 826, and, an AID type field 828.

The remainder of the values are one or more data records 810, with each data record containing a set of values that are indices to the TL-1 attribute definition records (FIG. 3(*a*)). Specifically, there is a value for all the TL-1 attributes that can possibly be part of an alarm record. TL-1 attribute value indices 810 that are used to build the alarm messages. These indices include the following values: a TL-1 CONDTYPE attribute 830, a TL-1 SEVERITY attribute 832, a TL-1 NTFCNCDE attribute 834, a TL-1 CONDEFF attribute 836, a TL-1 SRVEFF attribute 838, a TL-1 CREF attribute 840, a TL-1 DIRN attribute 842, a TL-1 LOCN attribute 844, a TL-1 MONTYPE attribute 846, a TL-1 i_MONTM attribute 848, a TL-1 MONVAL attribute 850, a TL-1 TMPER attribute 852, a TL-1 VLDTY attribute 854, a TL-1 THRESHVAL attribute 856, a TL-1 SIDE attribute 858, a TL-1 STATE attribute 860, a TL-1 AID attribute 862, a TL-1 AIDTYPE attribute 864, a TL-1 TBL attribute 866, and, a TL-1 ISLT attribute 868. The use of indices to the TL1 attribute definitions allows the SNES to represent large character strings with a single integer. This not only saves on the disk space required to store the converted playback files, but also minimizes memory usage during run time and allows the AMP to generate the alarms extremely fast by retrieving the character strings required to build the alarm directly from memory when it is time for an alarm to be sent. This same approach is used by the AMP to process user defined scenarios, as will be explained. Negative values for an alarm index mean that the attribute does not exist for a particular alarm record. The TL-1 attributes that are supported for playback are illustrated in FIG. 3(*a*) as described herein.

As mentioned above with respect to FIG. 2, the I/O Process 125 handles all communications between the SNES 100 and the NMS 75 via a TCP/IP socket 104 and additionally receives input from the user interface 110 through UNIX Domain sockets 106*a,b*. Input received from the Config/NE Data files 120 are in the form of a text file read.

After connecting the SNES 100 to the NMS 75, the I/O Process 125 will receive a connection request from the NMS and respond by sending a connection message to the CRP 150 and AMP 175 core processes to establish interprocess communications ("IPC") via UNIX Domain sockets 107*a*–107*c*. The connection message instructs the CRP 150 and AMP 175 processes that communications with a new NMS client connection have been established and the CRP 150 and AMP 175 core processes will respond by initializing the appropriate data structures for the new NMS client connection. The I/O process 125 then begins to read incoming and outgoing messages and sends them to the appropriate core process recipient(s).

All solicited messages 130 (responses to commands) generated by the CRP process 150 and all unsolicited messages 135 (events and alarms) generated by the AMP process 175 are sent to the NMS via the I/O Process 125. All inbound user directives from the GUI are read by the I/O process 125 and are either accepted by the I/O Process 125, or forwarded to either the CRP or AMP processes for execution. As will be explained, the user directives that the I/O Process 125 will accept and process are: the Simulation Cancel and Mediation Device Disconnect.

As illustrated in FIG. 2, the CRP process 150 receives NMS commands from the I/O Process 125 via connection 108*a* and formulates responses according to the specific message format of the network element that is being simulated. Specific message formats are contained within the Config/NE data 180 located in shared memory 140. Thus, the CRP receives a command, identifies the network element it is intended for, queries the Config/NE data 180 in shared memory for the appropriate response message structure, formulates a response message, and sends it to the I/O Process 125 which then passes the message on to the NMS. Additionally, the CRP process 150 accepts the inbound user directives from the GUI via the I/O process. As will be explained, the user directives that the CRP process 150 will accept and process are: Client Connection, Client Disconnection, Command Response delay and Message Time Stamp Biasing.

The AMP process 175 generates unsolicited event messages such as alarms for input to the NMS 75. Autonomous messages are generated by reading the user specified scenario file, which specifies what messages are to be sent and when. The "events" specified in the scenario are placed in a time ordered event queue 177 which is processed and updated during the simulation execution. As will be explained, the scenario file itself may be in the form of a "converted" Production Data file for real world message playback. Additionally, the AMP process accepts inbound user directives from the GUI via the I/O process via connection 108b. As will be explained, the user directives that the AMP process 175 will accept and process are: Fast Forward; Pause; Resume; Suspend/Resume Alarm Clearance; Client Connection; Client Disconnection, and Message Time Stamp Biasing.

In the preferred embodiment, each of the core processes share and update common data through the use of shared memory 140 that is organized in three mains segments: a client connection segment 143 that maintains client connection data including statuses and associated file descriptors; a mediation device segment 146 that contains the device type, the number of network elements under its span of control, and the TCP/IP port information; and, a network element segment 149 that contains detailed information about the state/status of each network element and its low level components and storage of alarms that the network element's generate during the simulation execution. Particularly, in the network element segment 149, the SNES maintains a state vector 147 for each network element and its provisioned components. The state vectors are updated in real time by the I/O 125, CRP 150 and the AMP 175 processes to reflect the actual state of the NE's based on the commands of alarms processed during the scenario. This state information comprises previous alarms sent and current network element mode resulting from commands previously sent. The previous alarms sent are retained in order to provide a realistic response to a "retrieve alarm all" command that can be generated by the network management device, which results in the retransmission of all outstanding alarms previously sent. An example command resulting in a network element state change is a "switch to protect" command which enables a protect channel of a network element to become the active channel. Such a change of "state" would be reflected in that network element's state vector.

Additionally, as shown in FIG. 2, there is a shared memory segment 145 that the three core processes use to communicate with the GUI interface 110 that enables a user to see simulation statistics during run time and to control the simulation execution.

As mentioned above, the internal architecture of the SNES is highly scalable, and each instance of the internal SNES architecture shown in FIG. 2 may be stacked, i.e., realized multiple times on a single computer system, as indicated by the stack 100'. Thus, as shown in FIG. 2, each replicated instance includes respective input and outputs to the GUI 110 and NMS 75 to enable simultaneous processing for a plurality of Config/NE process sets, each Config/NE process set defining a limited number of mediation devices, e.g., 150 devices, and associated network elements, depending upon the computer system employed. A single instance will typically utilize about 2.0 Megabytes of shared memory 140 and it should be understood that the amount of shared memory will generally impose the limit on how many instances may be realized on a single computer. The stacking of architectures in this manner provides scalability as each instance can simulate a process set, in parallel, e.g., when a multi-processing environment, is employed. As an example, if it is desired to simulate 200 mediation devices, the first instance will accommodate the simulation of, e.g., 150 mediation devices and the second instance of the stack will simulate the remaining 50 mediation devices/network elements.

FIGS. 4(a)–4(e) comprise a detailed flowchart illustrating the high-level process performed by the SNES of the invention, with reference to the logical components shown in FIG. 2.

Figure 4A:
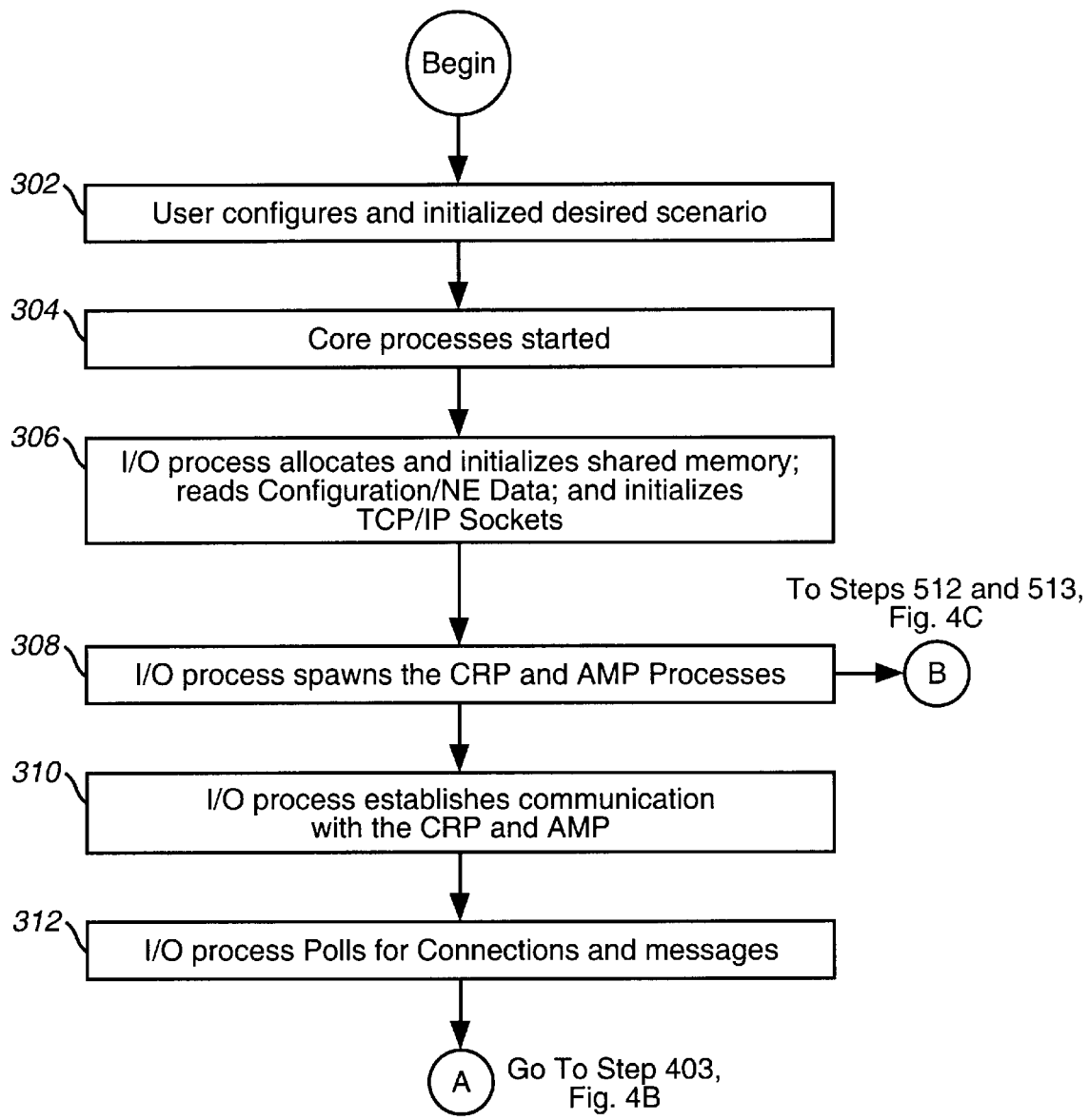
FIGS. 4(a)–4(e) illustrate the high-level process performed by the SNES of the invention, with FIGS. 4(a) and 4(b) illustrating a functional block diagram of the initialization procedures and I/O process thread of the SNES.
Figure 4B:
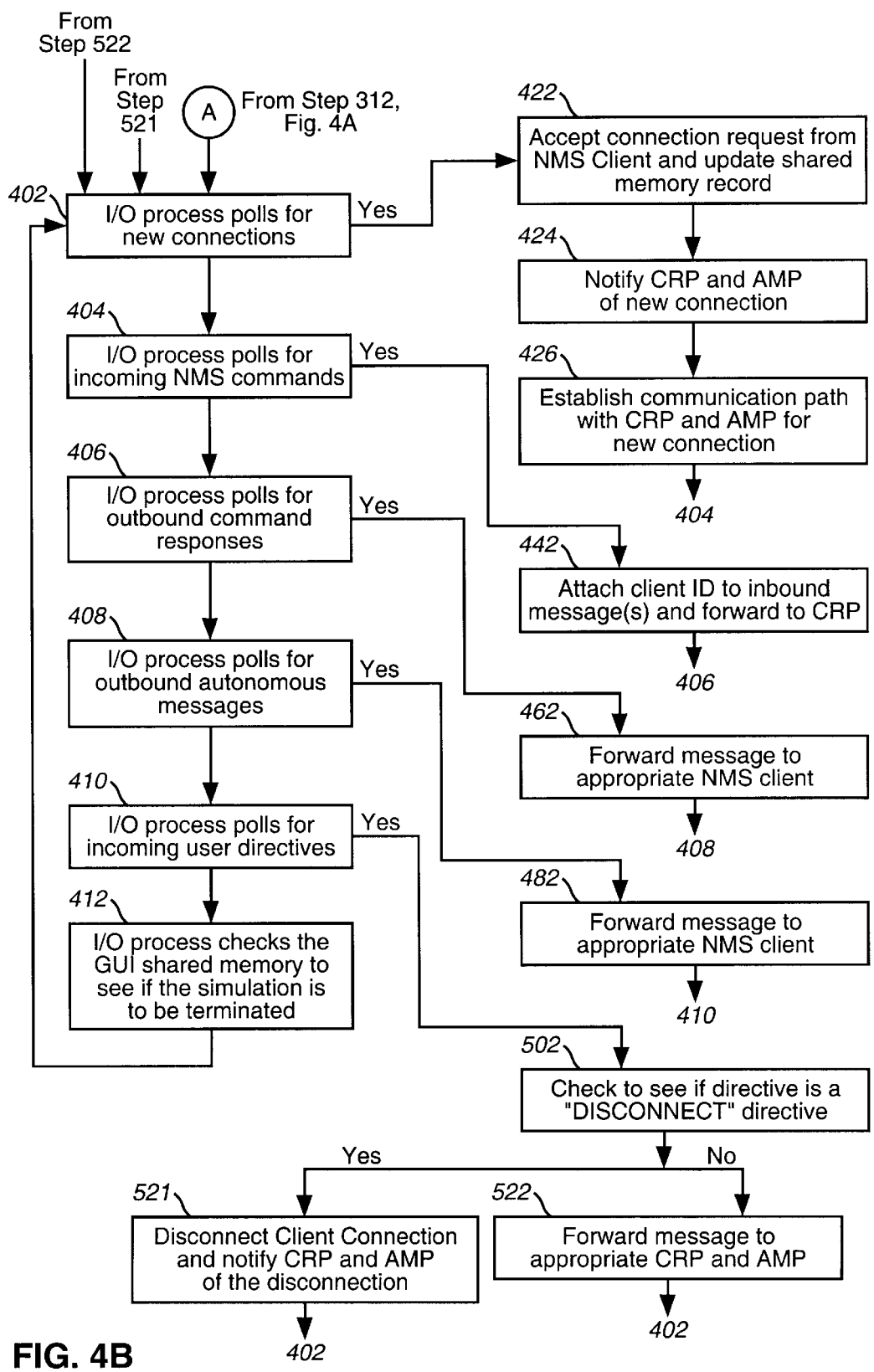
Figure 4C:
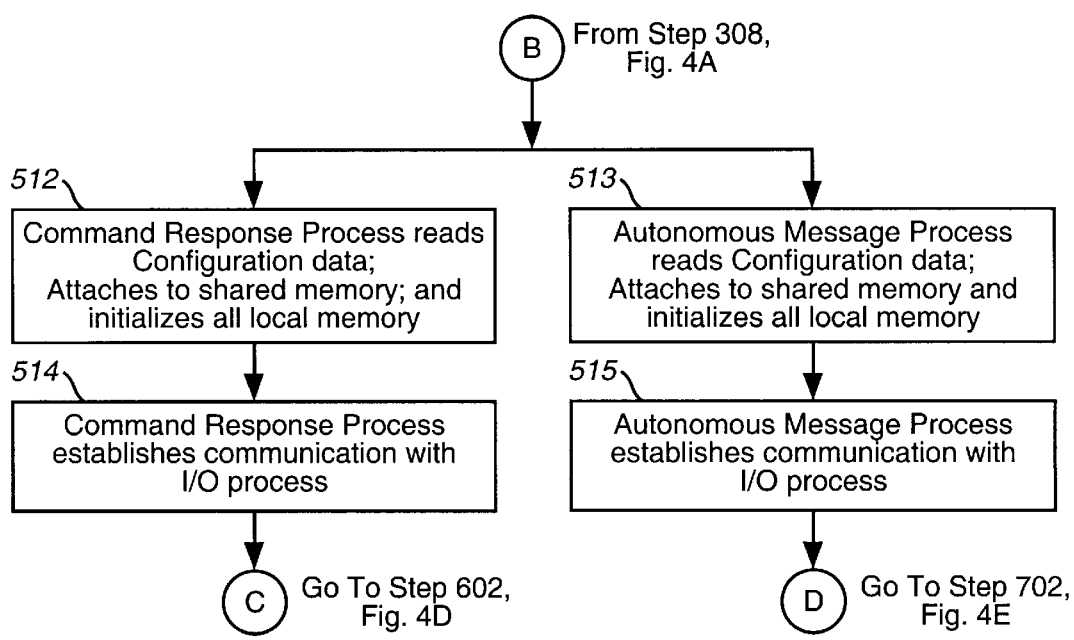
Figure 4D:
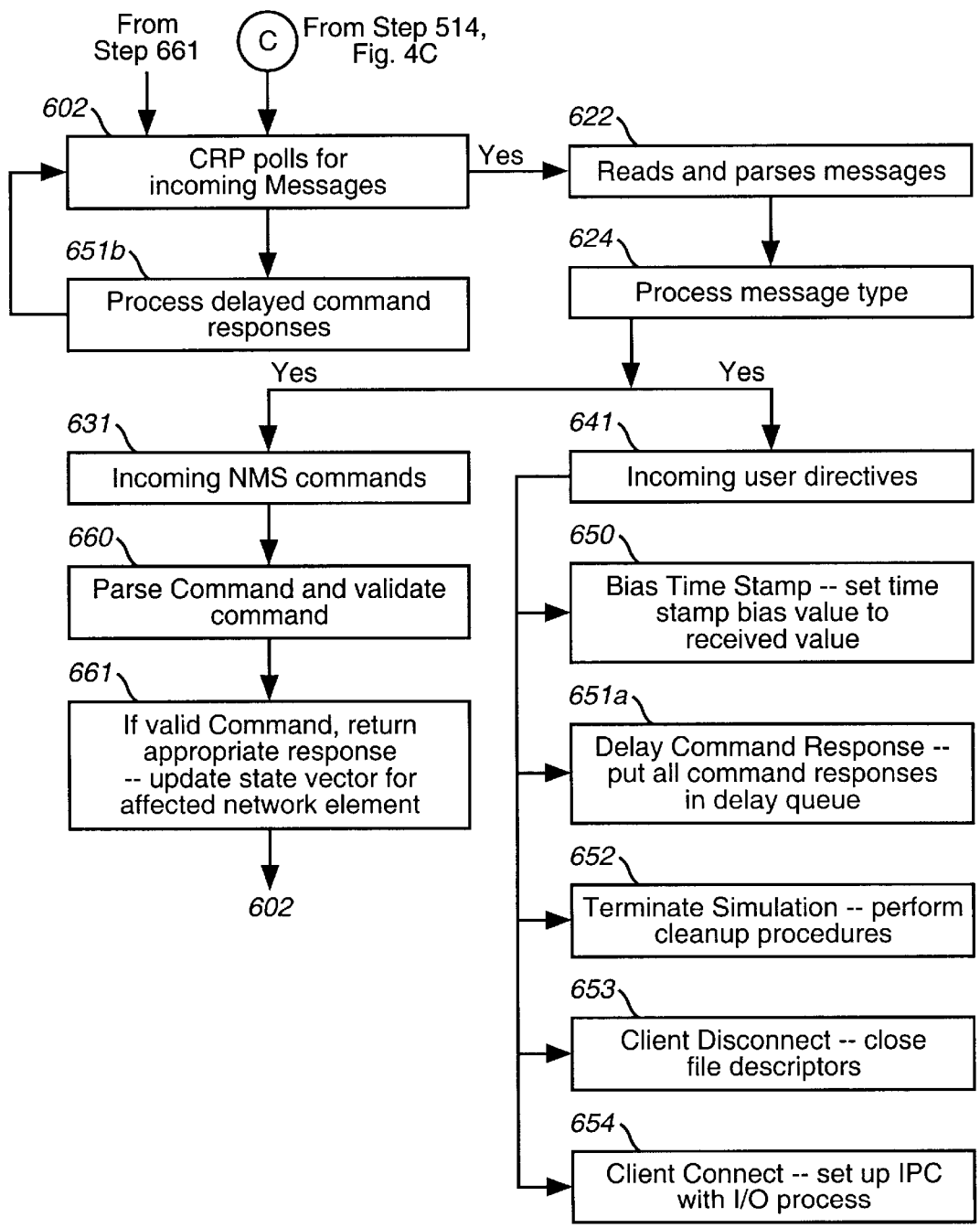
Figure 4E:
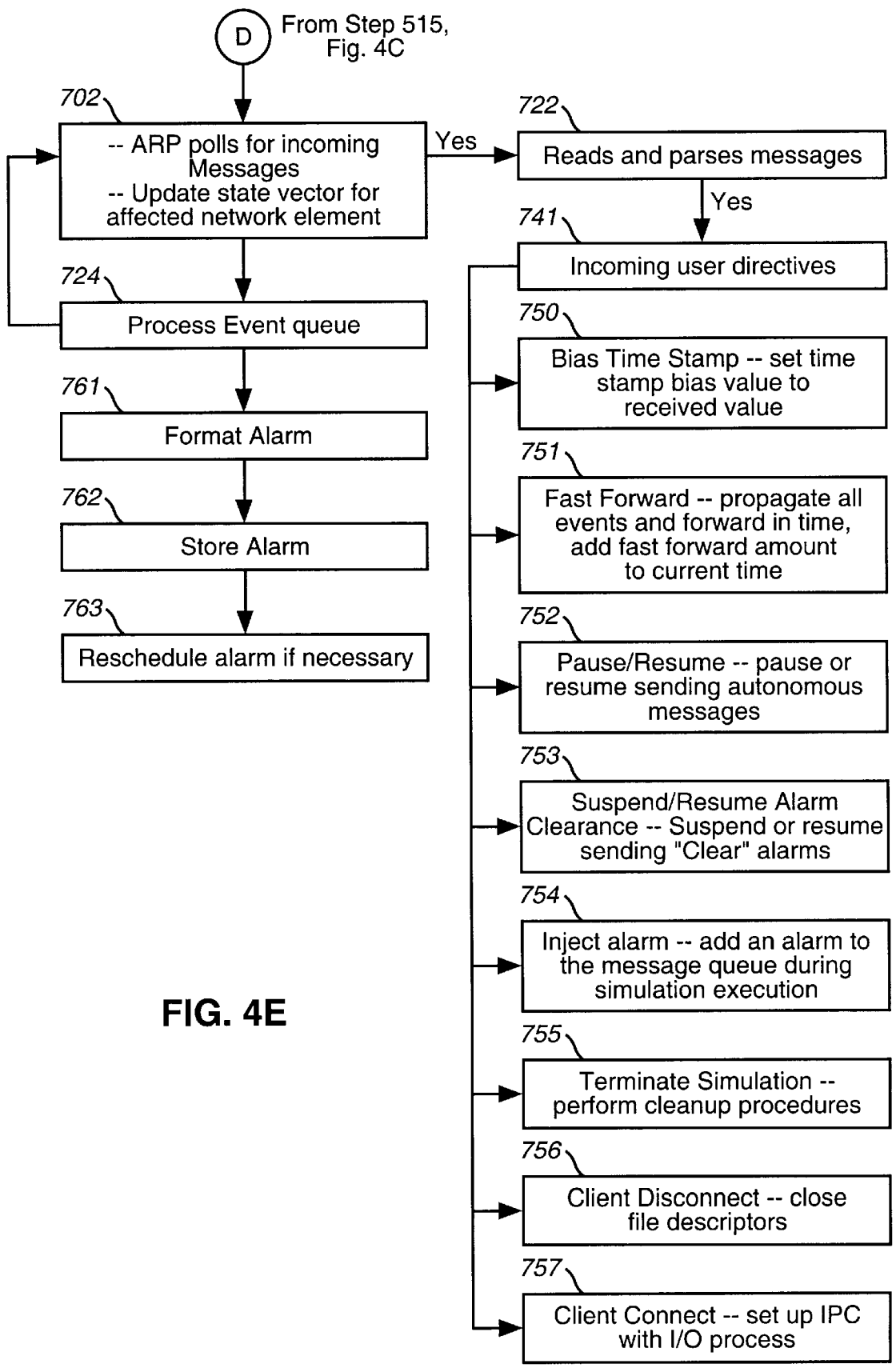

As indicated at step 302, FIG. 4(a), the user configures and initializes the desired scenario through the GUI and the GUI starts the core processes at step 304. At step 306, the I/O process reads the simulation configuration data files and utilizes the information in the data files to allocate and initialize the required shared memory, write the NE configuration data into the shared memory and initialize the TCP/IP sockets that will be used to communicate with the NMS.

The NE configuration data files specifies each of the network elements and mediation devices that are to be simulated and how they are arranged in a network. Additional configuration files used by the SNES describe detailed information about the simulated NE types. The information comprises the TL-1 attribute definitions; the TL-1 alarm messages formats and contents; performance measurement data; login process definition; and provisioning data. This information is read and initialized in local memory by each of the core processes and is not part of the shared memory since it is used as read only information. The CRP and AMP processes both use the same information in the configuration files as will be described herein.

As indicated at step 308, the I/O process spawns the Command Response and Autonomous Message Processes and sets up a communication path with both the CRP and AMP processes at step 310. The Command Response and Autonomous Message process threads will be described in greater detail with reference to FIGS. 4(c)–4 (e). Particularly, as will be described, each of the three core processes operate continuously and in parallel with steps 502–522 (FIG. 4(b)) describing the continued processing of the I/O Process thread, steps 602–661 (FIGS. 4(c) and 4(d)) describing the continued processing of the CRP process thread and steps 702–763 (FIGS. 4(c) and 4(e)) describing the continued processing of the AMP process thread.

As indicated at step 312, the I/O process of the invention is a polling process that continuously polls for both input connections and messages. As illustrated at step 402 in FIG. 4(b), the I/O process first continuously polls for new client connections. If a new connection is requested by the NMS, the I/O Process proceeds as follows: first, at step 422, it will accept the connection if a live connection is not already in use for that client and will initialize the client data in shared memory; then, at step 424, it will notify the CRP and AMP processes of the new connection; and, at step 426 will establish a communication path with the CRP and with the AMP to forward outbound command responses and autonomous messages to the NMS client. The I/O process continues to step 404 where it polls for incoming NMS commands. These commands are in the TL-1 protocol and, when received, are directly forwarded to the CRP as indicated at step 442. The Client ID is attached to the message to enable the CRP to know which I/O connection to send the command response back through. The process then continues at step 406, where the I/O process polls for outbound NMS command responses that are generated from commands received by the CRP from the I/O process (as identified in step 442). If outbound NMS command responses are received, the I/O process forwards the contents of the message directly to the NMS client as indicated at step 462. The process then continues at step 408, where the I/O process polls for outbound autonomous messages generated by the AMP in accordance with the user specified scenario.

In response to receiving an outbound autonomous message, the I/O process simply forwards the contents of the message directly to the NMS client at step 482. The process then continues at step 410, where the I/O process polls for inbound user directives that are sent to the core processes by the GUI. If an incoming user directive is not received, then the process proceeds to step 412, where the I/O process checks the GUI shared memory to see if the simulation is to be terminated. The simulation may be terminated for several reasons: by user request; the simulation duration has been exceeded; or if a core process has failed unexpectedly. If the simulation is to be terminated, the I/O process notifies the CRP and AMP to shutdown and close all their open file descriptors. Additionally, the I/O process shuts down and closes all its open file descriptors and removes the shared memory segments. At this point, if the simulation is not to be terminated, the I/O process returns to step 4C2 and will continue the steps described in 402–412.

If, at step 410, an incoming user directive is received, a determination is then made at step 502 to determine if the directive is a "Disconnect" directive that instructs the I/O process to terminate a connection between the NMS and a simulated mediation device. If it is a "Disconnect" directive, then at step 521, the corresponding client connection is terminated and the CRP and AMP processes are notified of the termination. Specifically, when the connection is terminated, the I/O process informs the CRP and AMP processes to close their associated file descriptors for the disconnected client. The communication disconnection is maintained for a userspecified amount of time and the I/O process will not accept any connection requests for the disconnected mediation device until the time limit has expired. If at step 502, the user directive is not a "Disconnect" directive, then as indicated at step 522, the I/O process will forward the directive to the CRP and AMP processes. After implementing either step 521 or 522, the I/o process will continue the I/O polling thread by returning to step 402.

As indicated at step 308, FIG. 4(*a*), the I/O process spawns the CRP and AMP process threads which continuously run in parallel. Thus, as shown in FIG. 4(*c*), steps 512 and 514 of the CRP process thread are executed in parallel with corresponding steps 513 and 515, respectively, of the AMP process. Specifically, at step 512, the CRP process reads its configuration files and, in response to the initialization data, the CRP attaches to the shared memory allocated by the I/O process, allocates and initializes its local memory and data structures and, at step 514, establishes communication with the I/O process. The AMP process thread performs the same processing as the CRP as noted in steps 513 and 515. Additionally, if the user decides to playback a converted file, that file is read in by the AMP core process during the AMP initialization at step 513, and the AMP stores all the alarm records in memory in the time ordered event queue 177 (FIG. 2). As explained, the event records maintain all the necessary information to build an alarm message when it is time for the alarm to be sent. Further details of the CRP and AMP processing threads are described as follows:

After initialization has been complete, the CRP process thread continuously polls for inbound messages, NMS Commands and user directives during the simulation execution as indicated at step 602 in FIG. 4(*d*). If one or more messages have been received, the process parses the TL-1 message header at step 622 and, at step 624 determines whether the message is a NMS Command or a user directive.

As a result of the processing at step 624, a determination is made that the message is either an NMS command (step 631), or a user directive (step 641). If the message is an NMS command, then at step 660, the message is parsed and validated against the allowable TL-1 command parameters. Once the command has been validated, the appropriate response is formed and returned to the I/O process at step 661. If the message effects the state of a network element(s), the state vector indicating the status of the network elements is updated in this step. The process then repeats by returning to step 602.

If, at step 641, the message is a user directive, the directive ID is taken out of the message header which is used to determine if the CRP should process the directive. As mentioned briefly above, the directives that the CRP processes are: Client Connection, Client Disconnection, Time Stamp Bias, Delay Command Response and Simulation termination. If a Time Stamp Bias is received, as indicated at step 650, the value the user specified in the message body is extracted and added to all subsequent command responses. If a Delay Command Response directive is received, as indicated at step 651*a*, all subsequent command responses are time stamped and placed in a time ordered queue 157 (FIG. 2). When the time has been reached for the message(s) in the queue to be sent, they are taken from the queue and sent to the I/O process as indicated at step 651*b* in FIG. 4(*d*). When a Client Connection directive is received, as indicated at step 654, the CRP establishes an IPC with the I/O process for the new client. When a Client Disconnection directive is received, as indicated at step 653, the CRP closes the open file descriptors for the disconnected client. Finally, if a Simulation Termination directive is received, as indicated at step 652, the CRP performs cleanup procedures by closing all open file descriptors, removing any files created during simulation execution, and detaching itself from the shared memory.

As mentioned above with respect to step 513, FIG. 4(*c*), the initialization of the AMP process comprises setting up the "event queue" to process the specified alarm messages. Preferably, the event queue 177 (FIG. 2) is populated by either a user defined scenario or a converted production set of data. Specifically, in order to maintain high output rates, the AMP process uses indices to TL-1 attribute definitions (FIG. 3(*a*)) to represent the character strings that make up the actual alarm. The TL-1 alarm definition files (FIG. 3(*e*)) define the attribute values that make up all the alarms for an NE type. During the initialization of the event queue, each alarm in the scenario is read. The alarm ID is taken from each scenario record and is used to lookup the alarm attribute definition values that make up the desired alarm. The event record that is added to the event queue is populated with the indices to the TL1 attribute values and are later used in the generation of the alarm.

After initialization, the AMP processes the event queue, as indicated at step 724, and periodically checks for incoming directives during the simulation execution. In step 702 the AMP polls for any inbound messages. If one or more messages have been received, it parses the message header and processes the user directive as indicated at step 722. As indicated at step 741, the directive ID is taken out of the message header which is then used to determine if the AMP should process the directive. As indicated at steps 750 to 757, the directives that the AMP processes are: Time Stamp Bias, Simulation Pause/Resume, Suspend/Resume Alarm Clearance, Inject Alarm, Client Connection, Client Disconnection, and Simulation Termination. As indicated at step 750, if a Time Stamp Bias is received, the value the user specified in the message body is extracted and added to all subsequent command responses. As indicated at step 751, if a Fast Forward directive is received, the event queue is propagated forward this amount of time. As indicated at step 752, if a Simulation Pause/Resume directive is received, the processing of events in the event queue is paused/resumed. As indicated at step 753, if a Suspend/Resume Alarm clearance directive is received, alarms that are "Clear" alarms are suspended/resumed. As indicated at step 754, if an Inject Alarm directive is received, the alarm data is parsed from the message body and the alarm is added to the event queue. As indicated at step 756, if a Client Disconnection directive is received the AMP closes the open file descriptors for the disconnected client. Finally, if a Simulation Termination directive has been received, as indicated at step 755, the AMP closes all open file descriptors, removes any files created during simulation execution, and detaches itself from the shared memory.

The event queue 177 (FIG. 2) is processed by the AMP in a time ordered sequence, e.g., FIFO, with the alarm event assigned the earliest time being the first event on the queue. The event is basically an item that describes the elements necessary to build an alarm message which occurs at steps 761 and 762 in FIG. 4(*e*). The message is formatted based on the information contained in the event and is forwarded to the I/O process. After the message has been sent to the I/O process, the AMP reschedules the event at step 763 if the event has not exceeded its duration and is an event that can be rescheduled. It should be understood that if the processed alarm effects the state of a network element(s), the state vector indicating the status of the affected network elements is updated.

The foregoing merely illustrates the principles of the present invention. Those skilled in the art will be able to devise various modifications, which although not explicitly described or shown herein, embody the principles of the invention and are thus within its spirit and scope. For instance, communications devices, e.g., switches, can be modeled in the simulator with bandwidth throughput and error rate performance criteria being used to simulate the generation of alarms and performance messages.

What is claimed is:

1. A network element simulator for simulating behavior of network elements capable of being interconnected to function as a telecommunications network, said network capable of being managed by a network management system that generates commands for receipt by said network and receives network responses, said apparatus comprising:
   means for inputting data representing behavioral of network elements to be simulated;
   input/output processing component for communicating with said network management system, said input/output processing component including means for receiving commands from said network management system and forwarding responses generated by said simulator to said network management system;
   a response generator means in communication with said input/output processing means for receiving said network management commands and generating appropriate responses in accordance with said network element behavior data;
   an autonomous message generator means for autonomously generating one or more unsolicited messages for input to said network management system;
   wherein receipt of said commands and generation and forwarding of responses and autonomous messages are concurrently performed.

2. A network element simulator according to claim 1, further including memory storage means for storing said network element behavior data, each said input/output processing, response generator means and autonomous message generator means capable of inputting data to and receiving data from said memory storage means.

3. A network element simulator according to claim 1, further including a graphical user interface means for enabling users to input said network element behavior data.

4. A network element simulator according to claim 3, wherein said graphical user interface means includes means for inputting a set of commands specifying particular network behavior for simulation at user-specified times.

5. A network element simulator according to claim 3, wherein said graphical user interface means includes means for inputting commands captured from an existing network.

6. A network element simulator according to claim 4, wherein said set of commands includes a command for initiating a start time for said network simulation and a stop time for terminating said network simulation.

7. A network element simulator according to claim 3, wherein said graphical user interface means includes means for inputting real-time commands during network simulation.

8. A network element simulator according to claim 5, wherein said set of commands includes commands for generating an alarm message for said network management system.

9. A network element simulator according to claim 8, wherein said autonomous message generator means includes an event queue means containing an ordered set of alarm messages to be sent to said network management system at predefined times.

10. A network element simulator according to claim 5, further including means for scaling a simulation of a large network across multiple network element simulators operating concurrently, each of said multiple network element simulators communicating with said graphical user interface and said network management system, said scaling means distributing a set of data specifying behavior of a subset of network elements comprising said large network across a respective one of said multiple simulators for simulation thereat.

11. A network element simulator according to claim 9, wherein said monitoring means includes means for maintaining a state vector of each network element to be simulated, said response generator and an autonomous message generator capable of updating said state vector based on commands received and alarm messages processed.

12. A network element simulator according to claim 10, wherein said network management system monitors performance of network elements, said autonomous message generator means further including means for generating network element performance data for input to said network management system.

13. A network element simulator according to claim 1, wherein said simulated network elements includes one selected from the group consisting of SONET network re-generation equipment, termination equipment and mediation devices, and combinations thereof.

14. A network element simulator according to claim 1, wherein said data representing behavior of network elements to be simulated includes configuration data representing interconnection of said network elements to said mediation devices.

15. A network element simulator according to claim 1, wherein said data representing behavior of network elements to be simulated includes attribute data of said elements.

16. A network element simulator according to claim 1, wherein said means for receiving commands from said network management system and forwarding responses generated by said simulator includes one or more TCP/IP connection connected in parallel with said network management system.

17. A network element simulator according to claim 9, wherein said network element behavior data include alarm definition files specifying alarms that each said simulated network element can generate.

18. A network element simulator according to claim 17, wherein said alarm messages include data records containing indices to associated alarm definitions contained in said alarm definition files, said autonomous message generator means generating said alarm messages from said indices.

19. A network element simulator according to claim 5, further including preprocessing means for converting captured production data into said alarm message commands.

20. A network element simulator according to claim 7, wherein said response generator means includes a delay queue means for temporarily storing responses to be sent to said network management system, said real-time commands including commands to delay forwarding of said responses.

* * * * *